(12) United States Patent
Zhang et al.

(10) Patent No.: US 11,245,909 B2
(45) Date of Patent: Feb. 8, 2022

(54) TIMESTAMP AND METADATA PROCESSING FOR VIDEO COMPRESSION IN AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Manjiang Zhang, Sunnyvale, CA (US); Shengjin Zhou, Sunnyvale, CA (US); Shuai Wang, Beijing (CN); Shuangcheng Guo, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 273 days.

(21) Appl. No.: 16/461,350

(22) PCT Filed: Apr. 29, 2019

(86) PCT No.: PCT/CN2019/084994
§ 371 (c)(1),
(2) Date: May 15, 2019

(87) PCT Pub. No.: WO2020/220198
PCT Pub. Date: Nov. 5, 2020

(65) Prior Publication Data
US 2021/0195213 A1   Jun. 24, 2021

(51) Int. Cl.
*H04N 7/12* (2006.01)
*H04N 19/172* (2014.01)
*H04N 19/46* (2014.01)

(52) U.S. Cl.
CPC .......... *H04N 19/172* (2014.11); *H04N 19/46* (2014.11)

(58) Field of Classification Search
CPC . H04N 19/172; H04N 19/46; B60W 2556/10; B60W 60/0011; B60W 60/0027;
(Continued)

(56) References Cited

U.S. PATENT DOCUMENTS

| | | | |
|---|---|---|---|
| 10,969,783 B2 * | 4/2021 | Zhang | ................. G05D 1/0285 |
| 2018/0349715 A1 * | 12/2018 | Gupta | ...................... B60R 1/00 |

(Continued)

*Primary Examiner* — Gims S Philippe
(74) *Attorney, Agent, or Firm* — Womble Bond Dickinson (US) LLP

(57) ABSTRACT

A method to perform video compression for ADV is disclosed. The method receives multiple frames of image data from multiple cameras. Metadata are appended to each frame of the image data to generate one of multiple frames of uncompressed image data as the image data are received. The frames of uncompressed image data may be stored. To compress the image data later, the method retrieves the frames of uncompressed image data, extracts the metadata from each frame of the uncompressed image data to generate one of multiple frames of processed image data. The method compresses each frame of the processed image data with the metadata extracted to generate one of multiple frames of compressed image data. The method reattaches the metadata to a corresponding frame of the compressed image data to generate one of multiple compressed image frames. The metadata supports time synchronization and error handling of the image data.

21 Claims, 11 Drawing Sheets

(58) Field of Classification Search
CPC ............. B60W 2556/45; B60W 40/09; B60W 2554/402; B60W 2554/4029; B60W 2554/4045
USPC .................................................. 375/240.02
See application file for complete search history.

(56) References Cited

U.S. PATENT DOCUMENTS

| | | | | |
|---|---|---|---|---|
| 2019/0056483 | A1* | 2/2019 | Bradley | G01S 7/4972 |
| 2019/0302768 | A1* | 10/2019 | Zhang | B60W 50/14 |
| 2019/0327463 | A1* | 10/2019 | Zhao | H04N 19/103 |
| 2020/0064859 | A1* | 2/2020 | Zhang | G04R 20/26 |

* cited by examiner

TIMESTAMP AND METADATA PROCESSING FOR VIDEO COMPRESSION IN AUTONOMOUS DRIVING VEHICLES

CROSS-REFERENCE TO RELATED APPLICATION

This patent application is a U.S. National Phase Application under 35 U.S.C. § 371 of International Application No. PCT/CN2019/084994, filed Apr. 29, 2019, entitled "TIMESTAMP AND METADATA PROCESSING FOR VIDEO COMPRESSION IN AUTONOMOUS DRIVING VEHICLES," which is incorporated by reference herein by its entirety.

TECHNICAL FIELD

Embodiments of the present disclosure relate generally to operating autonomous vehicles. More particularly, embodiments of the disclosure relate to post processing of video streams for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The accuracy and efficiency of the motion planning and control operations depends heavily on the sensors of the vehicle. In particular, cameras are used to capture images and videos of scenes around the vehicle for motion planning and control. Standard-based image and video compression algorithms are used to compress the large amount of image or video data captured by the cameras. However, video compression algorithms are built for entertainment systems to facilitate viewings by users and do not support video post processing for machine perception processes running in ADV. Extensions to video compression standards to support features required by ADV applications are complicated and not universally supported. A simple and efficient mechanism to support post-processing of captured video data for ADV applications is needed.

SUMMARY

In an aspect of the disclosure, a method for operating an autonomous driving vehicle (ADV) is provided. The method includes receiving a plurality of frames of image data from one or more cameras mounted on the ADV; appending metadata to each of the frames of image data to generate one of a plurality of frames of uncompressed image data; extracting the metadata from each of the frames of uncompressed image data to generate one of a plurality of frames of processed image data; compressing each of the frames of processed image data to generate one of a plurality of frames of compressed image data; and reattaching the metadata to a corresponding one of the frames of compressed image data to generate one of a plurality of compressed image frames, where the compressed image frames are utilized to perceive a driving environment surrounding the ADV.

In another aspect of the disclosure, a sensor unit of an autonomous driving vehicle (ADV) is provided. The sensor unit includes a sensor interface to receive a plurality of frames of image data from one or more cameras mounted on the ADV; a preprocessing module to append metadata to each of the frames of image data to generate one of a plurality of frames of uncompressed image data; a processor to extract the metadata from each of the frames of uncompressed image data to generate one of a plurality of frames of processed image data; and a video codec to compress each of the frames of processed image data to generate one of a plurality of frames of compressed image data, where the processor is configured to reattach the metadata to a corresponding one of the frames of compressed image data to generate one of a plurality of compressed image frames, where the compressed image frames are utilized to perceive a driving environment surrounding the ADV.

In another aspect of the disclosure, an autonomous driving system is provided. The system includes a plurality of sensors to sense a driving environment surrounding an autonomous driving vehicle (ADV), including one or more cameras; a perception and planning system to plan a path and control the ADV according to the path to navigate the driving environment; and a sensor unit, where the sensor unit includes: a sensor interface to receive a plurality of frames of image data from the cameras, a preprocessing module to append metadata to each of the frames of image data to generate one of a plurality of frames of uncompressed image data, a processor to extract the metadata from each of the frames of uncompressed image data to generate one of a plurality of frames of processed image data, and a video codec to compress each of the frames of processed image data to generate one of a plurality of frames of compressed image data, where the processor is configured to reattach the metadata to a corresponding one of the frames of compressed image data to generate one of a plurality of compressed image frames, where the compressed image frames are utilized by the perception and planning system to perceive the driving environment surrounding the ADV.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
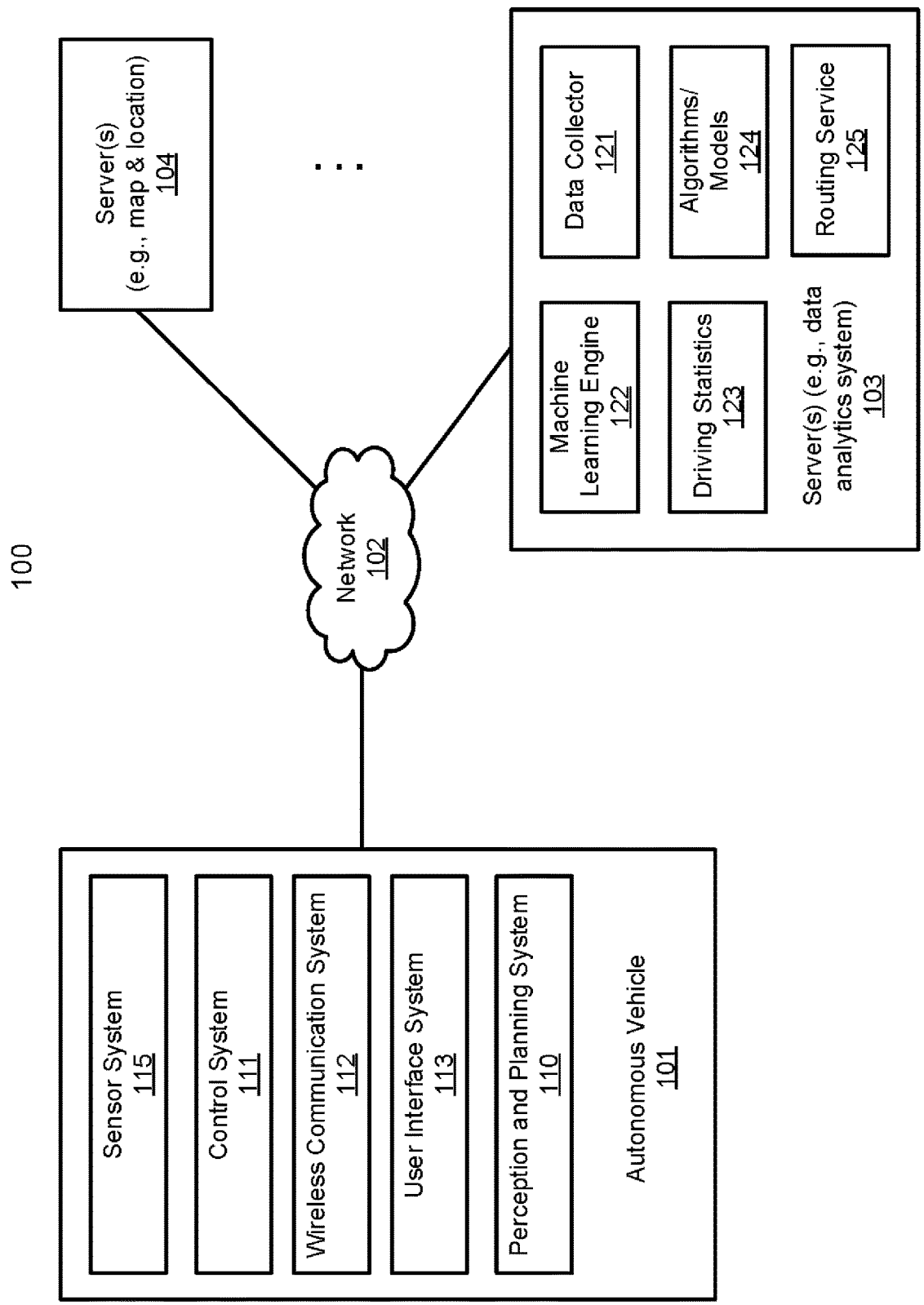
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one aspect, a sensor data processing method is performed to operate an ADV. In response to multiple frames of image data received from multiple cameras mounted on the ADV, metadata (e.g., timestamps) is attached or appended to each frame of the image data to generate one of multiple frames of uncompressed image data as the image data are received, e.g., as a part of a compression preprocess. Prior to compressing image data at a later time, as a pipelined process, the metadata is extracted from each frame of the uncompressed image data to generate one of multiple frames of processed image data. Each frame of the processed image data is then compressed with the metadata extracted to generate one of multiple frames of compressed image data, for example, using a regular video codec. The metadata is then reattached to a corresponding frame of the compressed image data to generate one of multiple compressed image frames.

According to another aspect, a sensor unit of an ADV includes a sensor interface to receive frames of image data from one or more cameras mounted on the ADV, a preprocessing module to append metadata to each of the frames of image data to generate one of a plurality of frames of uncompressed image data, a processor to extract the metadata from each of the frames of uncompressed image data to generate one of a plurality of frames of processed image data, and a video codec to compress each of the frames of processed image data to generate one of a number of frames of compressed image data. The processor is configured to reattach the metadata to a corresponding one of the frames of compressed image data to generate one of a plurality of compressed image frames, wherein the compressed image frames are utilized to perceive a driving environment surrounding the ADV.

According to a further aspect, an autonomous driving system includes a number of sensors that can be mounted on an ADV to sense a driving environment surrounding the ADV, including one or more cameras, a perception and planning system to perceive the driving environment and plan a path to control the ADV to navigate the driving environment. The sensor unit includes components as described above.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
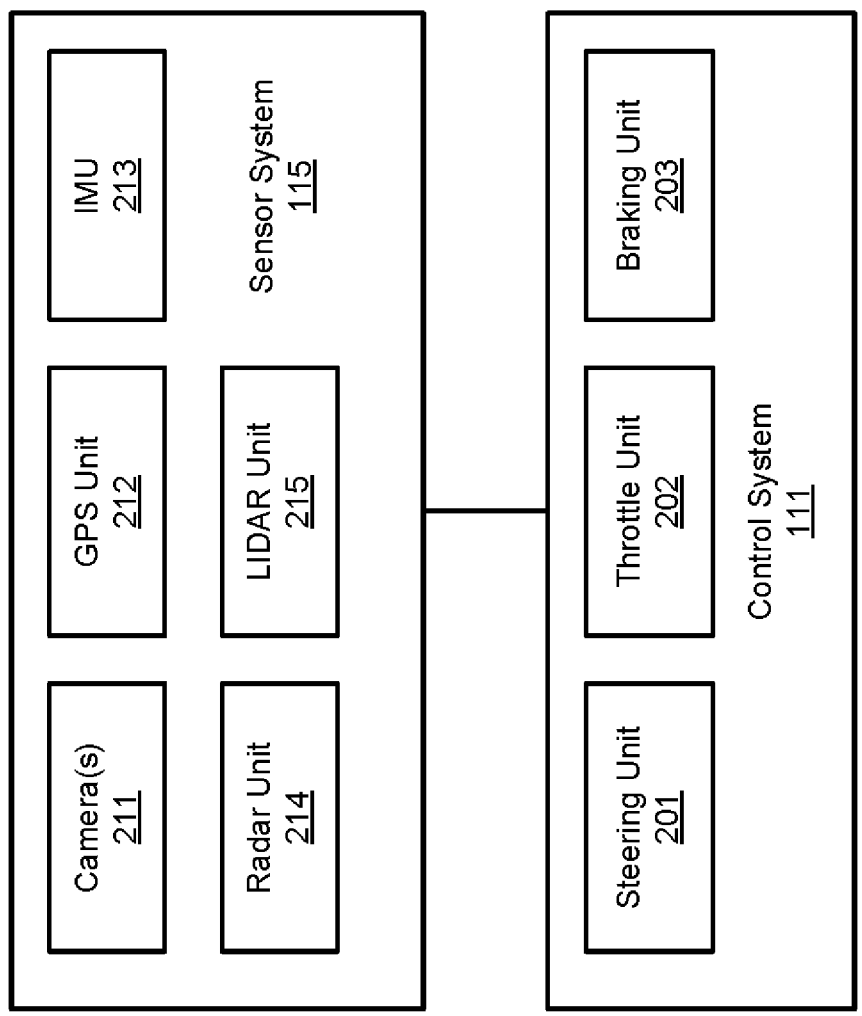
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include rules or algorithms for perception, prediction, decision, planning, and/or control processes, which will be described in details further below. Algorithms 124 can then be uploaded on ADVs to be utilized during autonomous driving in real-time.

In one embodiment, algorithms 124 may include a video processing algorithm that receives frames of video data from cameras 211. The video processing algorithm may append metadata to each frame of received video data to generate a video frame. A large number of video frames from multiple cameras may be stored in a memory. To compress the video frames, the video processing algorithm may read a video frame from the memory and may extract the metadata from the video frame. The video data without the metadata may be compressed by a video encoder to generate compressed video data. The video processing algorithm may attach the metadata back to the compressed video data to generate the compressed video frame that contains the compressed video data and the metadata. The compressed video frames may be transmitted to the perception and planning system 110 or to servers 103 through the network 102 for further processing and analysis of the images.

Figure 3A:
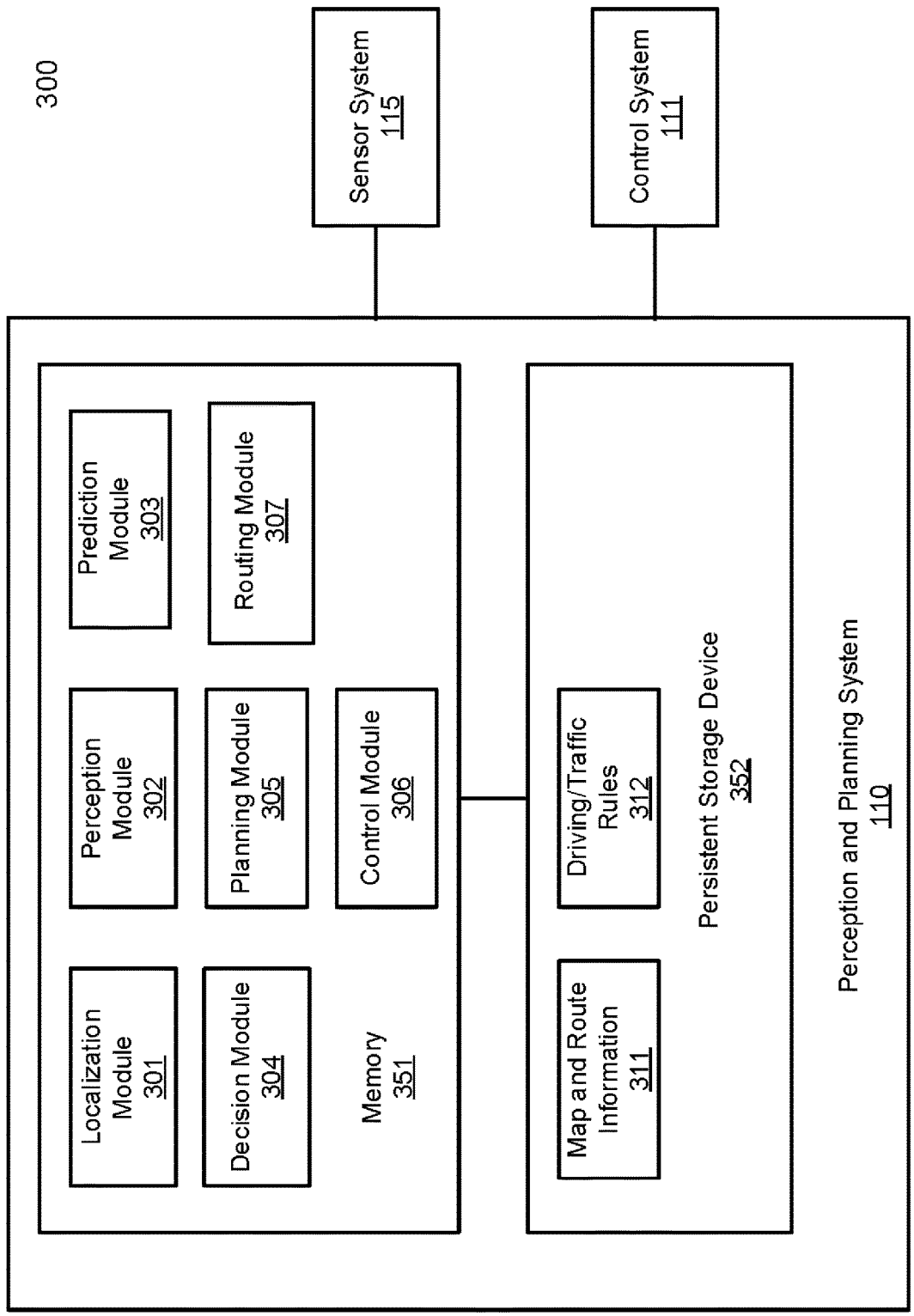
FIGS. 3A-3B are block diagrams illustrating examples of a perception and planning system used by an autonomous vehicle according to some embodiments.
Figure 3B:
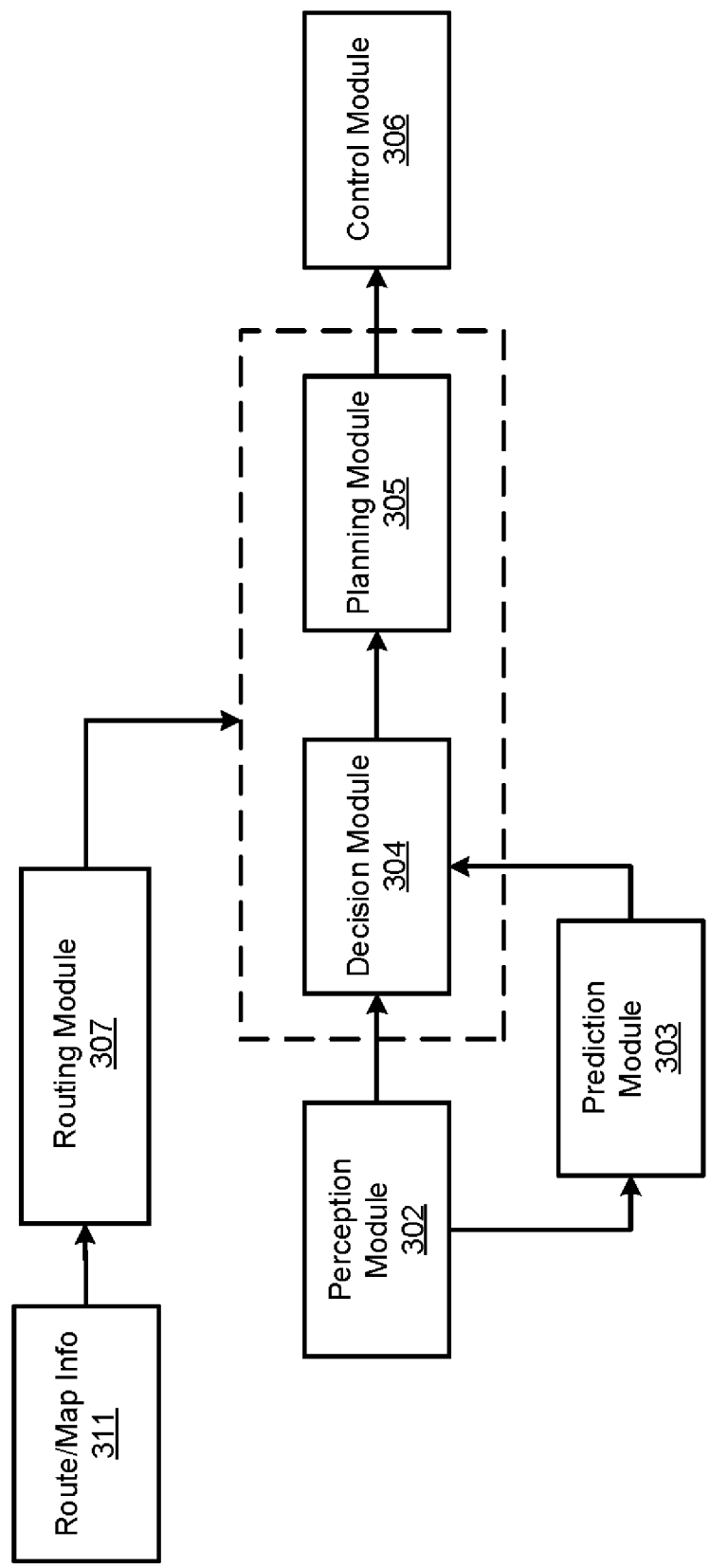

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
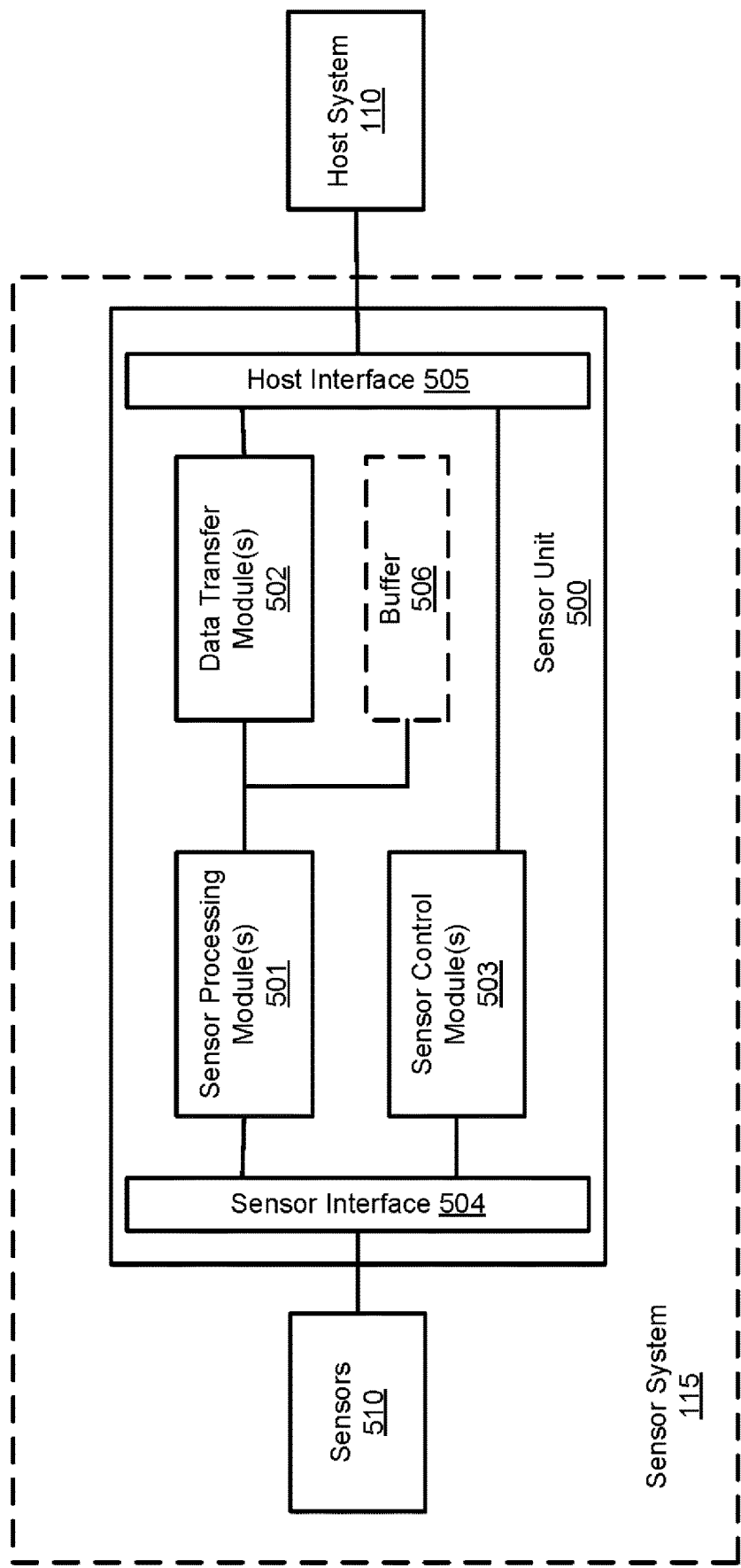
FIG. 5 is a block diagram illustrating an example of a sensor unit according to one embodiment.

FIG. 5 is a block diagram illustrating an example of a sensor system according to one embodiment of the disclosure. Referring to FIG. 5, sensor system 115 includes a number of sensors 510 and a sensor unit 500 coupled to host system 110. Host system 110 represents a planning and control system as described above, which may include at least some of the modules as shown in FIGS. 3A and 3B. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel includes a specific sensor processing module and a specific data transfer module that have been configured or programmed to handle the corresponding sensor data and protocol.

Figure 6:
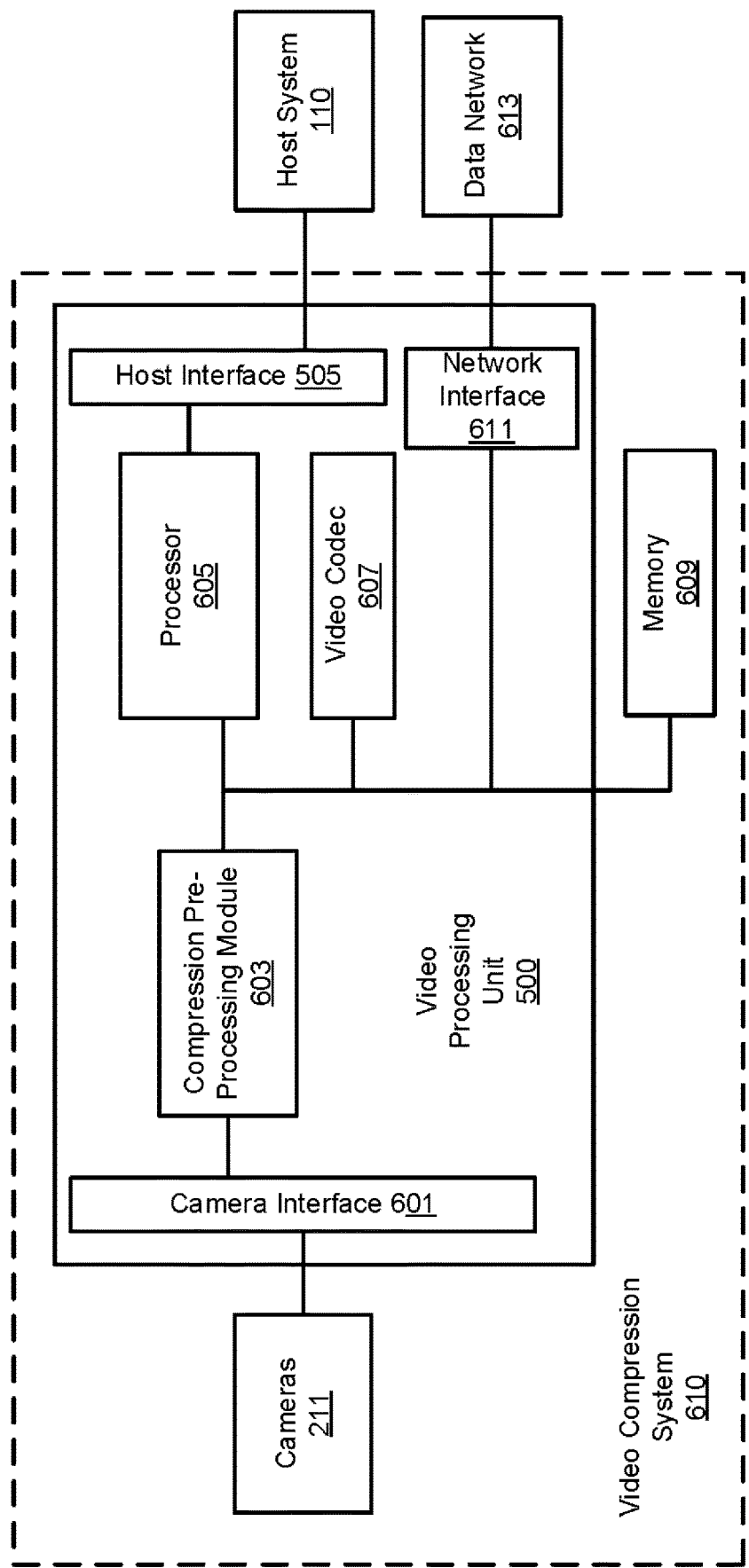
FIG. 6 is a block diagram illustrating an example of a video compression system according to one embodiment.

FIG. 6 is a block diagram illustrating an example of a video compression system 610 according to one embodiment. Video compression system 610 represents one embodiment of the sensor system 115 of FIG. 5 in which the sensors are one or more cameras 211 configured to capture scenes around the ADV. Cameras 211 may be still cameras and/or video cameras. Each of cameras 211 may be associated with a channel for providing images or a video stream of the environment surrounding the ADV. While the discussion that follows refers to the channel data as video data and the operations performed on the channel data as video compression or video processing, it is understood that the channel data may also represent image data captured by still cameras and the operations performed may be image processing or image compression.

A video processing unit 500 performs video post-processing on the multiple streams of video data received from cameras 211. The video post-processing operation may include timestamp tagging, video compression, data and channel synchronization, error handling and recovery, etc., of the video data. Video processing unit 500 may include a camera interface 601, compression pre-processing module 603, processor 605, video codec 607, host interface 505, and network interface 611. In one embodiment, video processing unit 500 may be implemented in a FPGA or an ASIC.

In another embodiment, one or more modules of the video processing unit 500 such as camera interface 601, compression pre-processing module 603, video codec 607, and network interface 611 may be implemented in a FPGA or an ASIC. Camera interface 601 is configured to receive video data streams from cameras 211 and may include one or more of Ethernet, USB, LTE or cellular, WiFi, serial (e.g., UART), and other GPIO interfaces. Video data are received as frames at a rate corresponding to the frame rate of a video camera. Each frame of video data may include header data, followed by the raw image data, and footer data. The header or footer data may contain information on the characteristics of a given one of cameras 211 that captured the raw image data or may contain information on the raw image data.

Compression pre-processing module 603 is configured to process the video data prior to video encoding. As there may be multiple channels of video data received from cameras 211 at the same time, compression pre-processing module 603 may add metadata to each frame of video data for time synchronization, channel differentiation, error handling, etc. In one embodiment, compression pre-processing module 603 may replace or modify the footer data to accommodate the added metadata.

Figure 7:
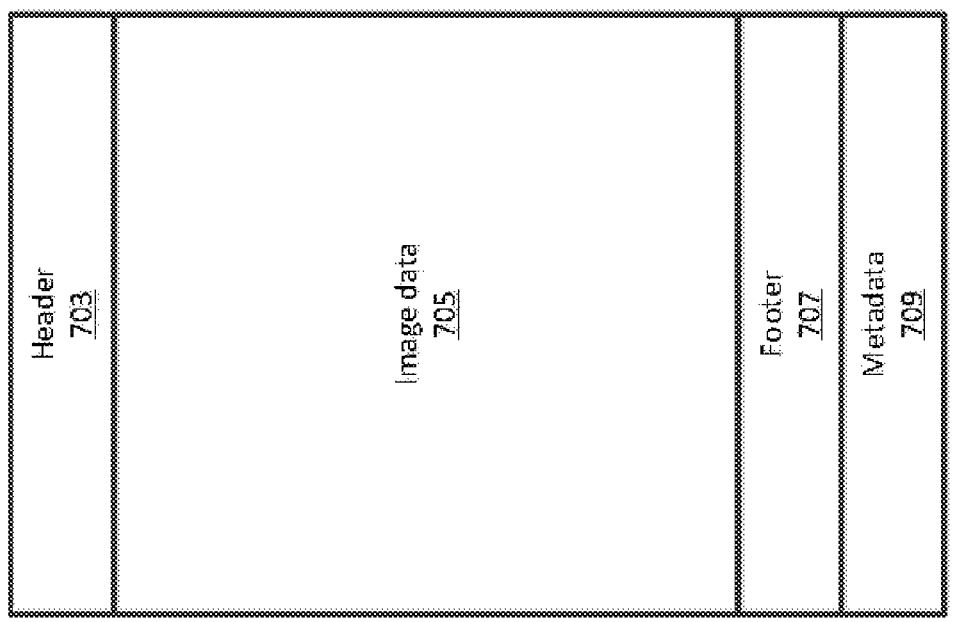
FIG. 7 is a diagram illustrating an image frame containing image data and metadata appended by the video compression system according to one embodiment.

FIG. 7 is a diagram illustrating an image frame 700 containing a frame of image data from a video camera and metadata appended by the video compression system 610 according to one embodiment. The image frame 700 contains header data 703, image data 705, footer data 707, and metadata 709. The header data 703 and footer data 707 envelope the frame of image data and are received from the video camera that captured the image data to contain information on the video camera or the image data. In one embodiment, compression pre-processing module 603 may replace or modify the footer data. The metadata 709 is added by the pre-processing module 603 to provide synchronization and error handling capabilities based on user defined message channels. In one embodiment, the metadata may be software configurable.

Figure 8:
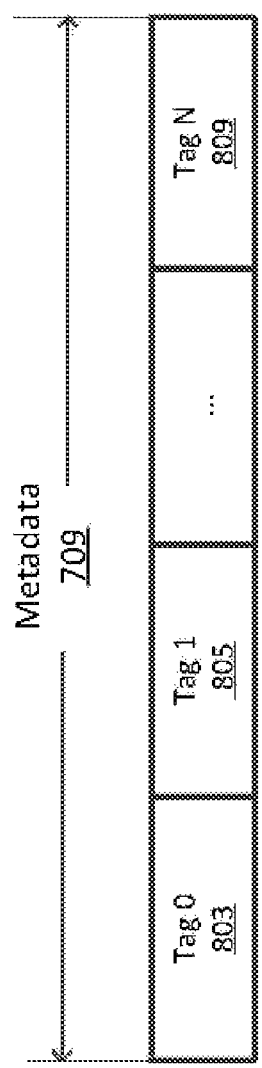
FIG. 8 is a diagram illustrating an example of metadata appended to the image data of an image frame according to one embodiment.

FIG. 8 is a diagram illustrating an example of metadata appended to the image data of an image frame according to one embodiment. Metadata 709 includes fields for sequence number 803, timestamp 805, error code 807, and channel number 809. The fields, the number of fields and their respective length may be software configurable. Sequence number 803 may be tagged to the image frame to indicate the sequential order of the image frame received from a camera. Timestamp 805 may be tagged to the image frame to indicate the time at which the image frame was received. Channel number 809 may be tagged to the image frame to indicate the camera or the channel providing the image frame. Sequence number 803, timestamp 805, and channel number 809 may be used by the ADV or a server to synchronize the multiple video data streams. Error code 807 may be used for error handling. Pre-processing module 603 or processor 605 of the video processing unit 500 may generate error code 807 during post-processing of the image frame. In one embodiment, Error code 807 may indicate camera error, internal buffer error of data buffers along the processing chain, out-of-order image frames and recovery, error in synchronization between the multiple channels and recovery, etc. In one embodiment, metadata 709 may include parity code or error correction code for integrity check of metadata 709.

Referring back to FIG. 6, compression pre-processing module 603 may store the image frame containing the appended metadata to memory 609. Memory 609 may include one or more volatile storage (or memory) devices such as random access memory (RAM), dynamic RAM (DRAM), synchronous DRAM (SDRAM), double data rate (DDR) DRAM, static RAM (SRAM), or other types of non-volatile solid-state, optical, or magnetic storage devices. In one embodiment, compression pre-processing module 603 may include a line buffer to buffer one or more lines of data of the image frame. As the line buffer is filled, compression pre-processing module 603 may perform direct memory access (DMA) to memory 609 to store the line buffer data containing the header data, raw image data, the footer data, and the metadata. Memory 609 may store the frames of video data streamed from multiple channels of cameras 211 that have been processed by compression pre-processing module 603. Memory 609 may also contain software executed by processor 605 to perform various post-processing functions of video processing unit 500.

For example, to reduce the storage space of the image frames, processor 605 may read the image frames from memory 609, or may receive the image frames from compression pre-processing module 603, to extract the metadata prior to sending the image frames to video codec 607 for video compression. In one embodiment, processor 605 may extract and reformat the header data, the footer data, and the metadata and may send the raw image data of the image frames to video codec 607. Video codec 607 may perform video compression on the frames of image data using the H.264, H.265, or other industry standards. Video codec 607 may be implemented in hardware, software, or a combination of hardware and software. Processor 605 may receive frames of compressed video back from video codec 607 and may reattach the metadata to the compressed video to reconstitute the image frames that now contain the compressed video. In one embodiment, processor 605 may reattach the header data and the footer data to the compressed video frame. In one embodiment, processor 605 may reformat the metadata, header data, or the footer data before reattaching them to the compressed video frame.

Processor 605 may transfer the compressed video frame to host system 110 using a communication protocol compatible with host interface 505. Host interface 505 may be any high speed or high bandwidth interface such as PCIe interface. Host system 110 may represent the perception and planning system 110, or control system 111 as discussed. In one embodiment, processor 605 may transfer the compressed video frame to data network 613 through network interface 611. Data network 613 may represent other systems of ADV, mass storage devices, or servers 103 or 104. Network interface 611 may be any wired or wireless communication interface. In one embodiment, processor 605 may be configured to perform buffer management functions when accessing uncompressed video frames from memory 609, extracting metadata from uncompressed video frames, transmitting uncompressed video frames to video codec 607, receiving compressed video frames from video codec 607, reattaching metadata to compressed video frames, and transmitting compressed video frames to host system 110 and data network 613.

Figure 9:
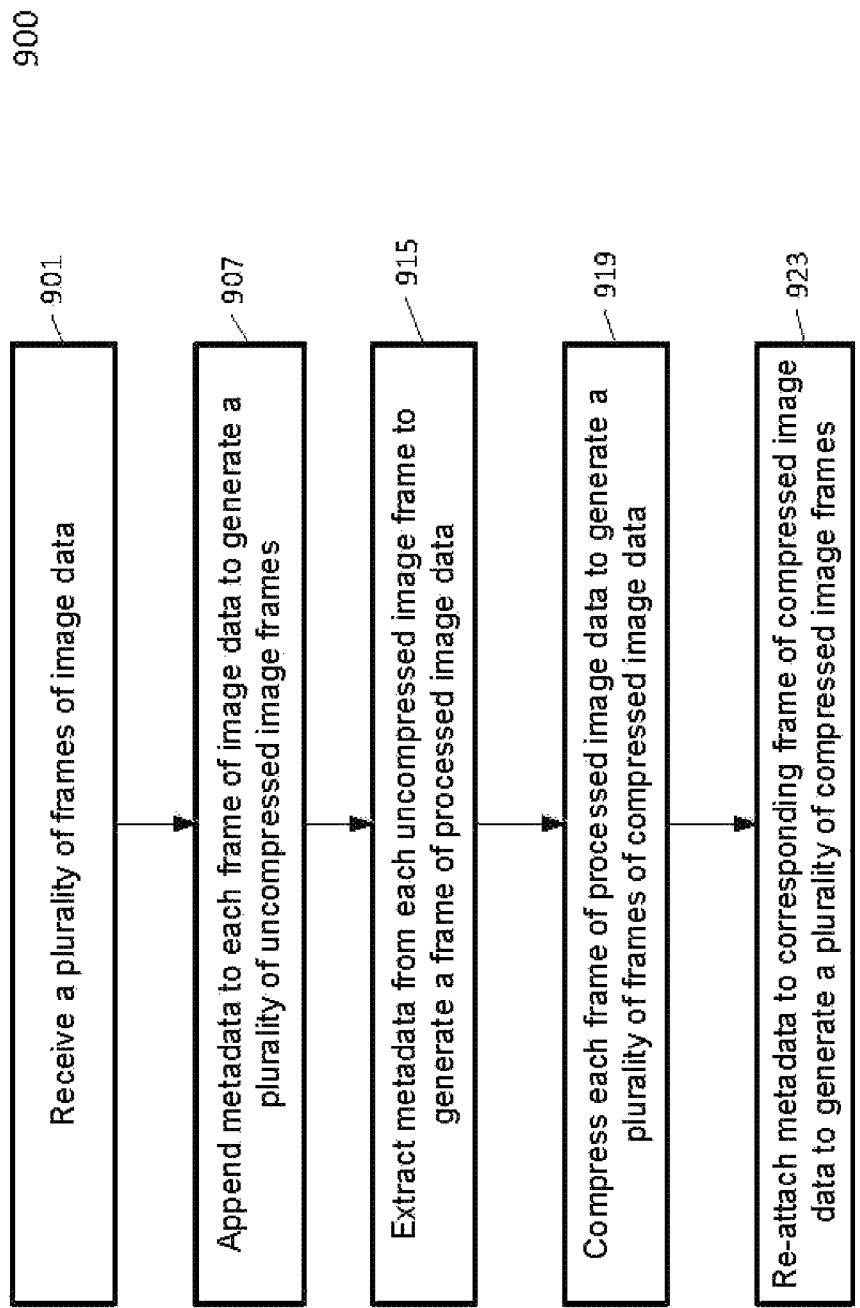
FIG. 9 is a flow diagram illustrating a method of video processing according to one embodiment.

FIG. 9 is a flow diagram illustrating a method of video processing according to one embodiment. The video processing method 900 may be performed by processing logic which may include software, hardware, or a combination thereof. For example, the path planning method 900 may be performed by compression pre-processing module 603, or the processor 605 of the video processing unit 500 of FIG. 6. At block 901, the video processing method 900 receives the image data from a video camera. The image data may be received as frames of video data with each video frame including header data, raw image data, and footer data.

At block 907, the video processing method 900 attaches metadata to each video frame to generate an uncompressed image frame containing the appended metadata. The metadata is added to the video frames to provide synchronization and error handling capabilities. The metadata may include software configurable fields of timestamp, sequence number, channel number, and error code. The uncompressed image frames from multiple channels of cameras may be stored in memory.

At block 915, the video processing method 900 extracts the metadata from each uncompressed image frame prior to sending the uncompressed image data for video compression. The video processing method 900 may read each uncompressed image frame from the memory, extract and reformat the metadata, and transmit the uncompressed image frame with the metadata extracted, referred to as a frame of processed image data, to a video codec. In one embodiment, the video processing method 900 may extract the header data and footer data from the uncompressed image frame and may transmit the frame of raw image data to the video codec.

At block 919, the video processing method 900 compresses each uncompressed image frame with the metadata extracted to generate frames of compressed video. In one embodiment, the video processing method 900 compresses each frame of raw image data to generate the frames of compressed video. At 923, the video processing method 900 reattaches the metadata to the corresponding frame of compressed video to reconstitute the image frames that now contain the compressed video. The metadata in the compressed video frame may be reformatted from the metadata in the uncompressed image frame prior to video compression. By attaching metadata to frames of streaming video data received from multiple cameras, extracting metadata from each frame before video compression, and reattaching metadata to compressed video to reconstitute frames of compressed video, the processing method 900 provides a simple and efficient mechanism to support post-processing of captured video data such as time synchronization and error handling.

Figure 10:
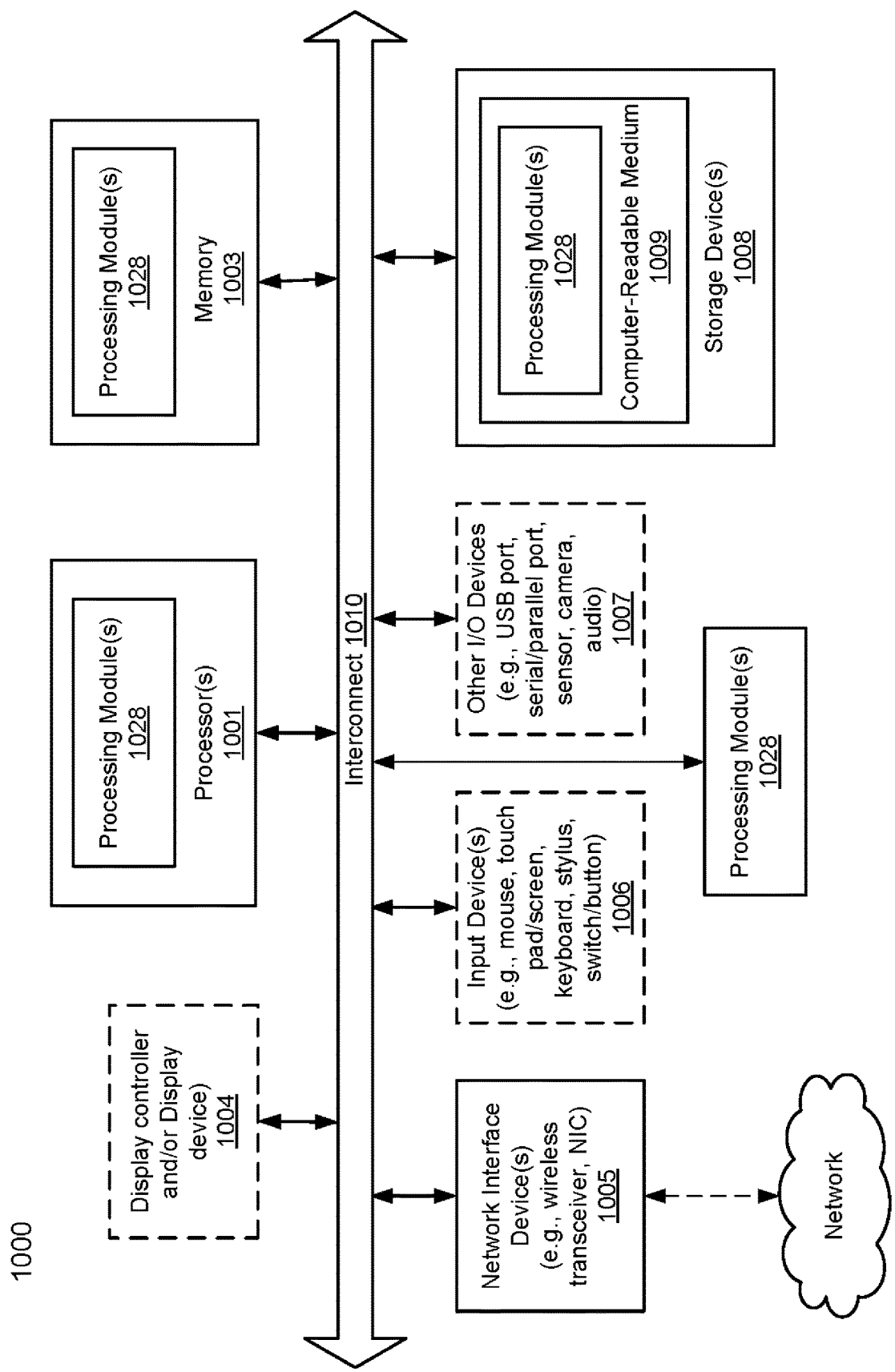
FIG. 10 is a block diagram illustrating a data processing system according to one embodiment.

FIG. 10 is a block diagram illustrating an example of a data processing system which may be used with one embodiment of the disclosure. For example, system 1000 may represent any of data processing systems described above performing any of the processes or methods described above, such as, for example, perception and planning system 110 including decision module 304, planning module 305 of FIGS. 3A and 3B, video compression system 610 of FIG. 6, or any of servers 103-104 of FIG. 1. System 1000 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1000 is intended to show a high level view of many components of the computer system. However, it is to be understood that additional components may be present in certain implementations and furthermore, different arrangement of the components shown may occur in other implementations. System 1000 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1000 includes processor 1001, memory 1003, and devices 1005-1008 connected via a bus or an interconnect 1010. Processor 1001 may represent a single processor or multiple processors with a single processor core or multiple processor cores included therein.

Processor 1001 may represent one or more general-purpose processors such as a microprocessor, a central processing unit (CPU), or the like. More particularly, processor 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1001, which may be a low power multi-core processor socket such as an ultra-low voltage processor, may act as a main processing unit and central hub for communication with the various components of the system. Such processor can be implemented as a system on chip (SoC). Processor 1001 is configured to execute instructions for performing the operations and steps discussed herein. System 1000 may further include a graphics interface that communicates with optional graphics subsystem 1004, which may include a display controller, a graphics processor, and/or a display device.

Processor 1001 may communicate with memory 1003, which in one embodiment can be implemented via multiple memory devices to provide for a given amount of system memory. Memory 1003 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor 1001, or any other device. For example, executable code and/or data of a variety of operating systems, device drivers, firmware (e.g., input output basic system or BIOS), and/or applications can be loaded in memory 1003 and executed by processor 1001. An operating system can be any kind of operating systems, such as, for example, Robot Operating System (ROS), Windows® operating system from Microsoft®, Mac OS®/iOS® from Apple, Android from Google®, LINUX, UNIX, or other real-time or embedded operating systems.

System 1000 may further include IO devices such as devices 1005-1008, including network interface device(s) 1005, optional input device(s) 1006, and other optional IO device(s) 1007. Network interface device 1005 may include a wireless transceiver and/or a network interface card (MC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The MC may be an Ethernet card.

Input device(s) 1006 may include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). For example, input device 1006 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1007 may include an audio device. An audio device may include a speaker and/or a microphone to facilitate voice-enabled functions, such as voice recognition, voice replication, digital recording, and/or telephony functions. Other IO devices 1007 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1007 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1010 via a sensor hub (not shown), while other devices such as a keyboard or thermal sensor may be controlled by an embedded controller (not shown), dependent upon the specific configuration or design of system 1000.

To provide for persistent storage of information such as data, applications, one or more operating systems and so forth, a mass storage (not shown) may also couple to processor 1001. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1001, e.g., via a serial peripheral interface (SPI). This flash device may provide for non-volatile storage of system software, including BIOS as well as other firmware of the system.

Storage device 1008 may include computer-accessible storage medium 1009 (also known as a machine-readable storage medium or a computer-readable medium) on which is stored one or more sets of instructions or software (e.g., module, unit, and/or logic 1028) embodying any one or more of the methodologies or functions described herein. Processing module/unit/logic 1028 may represent any of the components described above, such as, for example, decision module 304, or planning module 305 of FIGS. 3A and 3B, or video compression system 610 of FIG. 6. Processing module/unit/logic 1028 may also reside, completely or at least partially, within memory 1003 and/or within processor 1001 during execution thereof by data processing system 1000, memory 1003 and processor 1001 also constituting machine-accessible storage media. Processing module/unit/logic 1028 may further be transmitted or received over a network via network interface device 1005.

Computer-readable storage medium 1009 may also be used to store the some software functionalities described above persistently. While computer-readable storage medium 1009 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1028, components and other features described herein can be implemented as discrete hardware components or integrated in the functionality of hardware components such as ASICS, FPGAs, DSPs or similar devices. In addition, processing module/unit/logic 1028 can be implemented as firmware or functional circuitry within hardware devices. Further, processing module/unit/logic 1028 can be implemented in any combination hardware devices and software components.

Note that while system 1000 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for operating an autonomous driving vehicle (ADV), the method comprising:
    receiving a plurality of frames of uncompressed image data from one or more cameras mounted on the ADV;
    appending metadata to each frame of the plurality of frames of uncompressed image data to generate a plurality of metadata appended frames of the uncompressed image data;
    extracting the metadata from each frame of the plurality of metadata appended frames of the uncompressed image data to generate a plurality of frames of processed image data that do not comprise the extracted metadata;
    compressing each frame of the plurality of frames of processed image data to generate a plurality of frames of compressed image data; and
    reattaching the extracted metadata to corresponding frames of the plurality of frames of compressed image data to generate a plurality of compressed image frames, wherein the compressed image frames are utilized to perceive a driving environment surrounding the ADV.

2. The method of claim 1, wherein the extracted metadata comprises comprises a first portion that orders the plurality of frames of compressed image data, a second portion that indicates when image data of the plurality of frames compressed image data was generated, a third portion that indicates error states of the plurality of frames of compressed image frames, and a fourth portion indicating from which camera of the one or more cameras the image data of the plurality of frames of compressed image data was obtained.

3. The method of claim 1, further comprising:
    reformatting the metadata extracted from each of the frames of uncompressed image data to generate reformatted metadata, and wherein reattaching the extracted metadata to corresponding frames of the plurality of frames of compressed image data comprises reattaching the reformatted metadata.

4. The method of claim 1, wherein each of the frames of the plurality of frames of uncompressed image data received from the cameras comprises one frame of raw image data, a header data and a footer data associated with the one frame of raw image data.

5. The method of claim 4, further comprising:
replacing or modifying the footer data of one of the frames of the plurality of frames of uncompressed image data.

6. The method of claim 4, further comprising:
extracting the header data and the footer data from each of the frames of the plurality of frames of uncompressed image data to generate the plurality of frames of processed image data, and wherein compressing each frame of the plurality of frames of processed image data comprises compressing each of the frames of raw image data.

7. The method of claim 1, further comprising:
transmitting the plurality of frames of compressed image frames for perception and planning for operating the ADV.

8. A sensor unit of an autonomous driving vehicle (ADV), comprising:
a sensor interface to receive a plurality of frames of uncompressed image data from one or more cameras mounted on the ADV;
a preprocessing module to append metadata to each of the frames of the plurality of frames of uncompressed image data to generate a plurality of metadata appended frames of the uncompressed image data;
a processor to extract the metadata from each frame of the plurality of metadata appended frames of the uncompressed image data to generate a plurality of frames of processed image data that do not comprise the extracted metadata; and
a video codec to compress each frame of the plurality of frames of processed image data to generate a plurality of frames of compressed image data,
wherein the processor is configured to reattach the extracted metadata to corresponding frames of the plurality of frames of compressed image data to generate a plurality of compressed image frames, wherein the compressed image frames are utilized to perceive a driving environment surrounding the ADV.

9. The sensor unit of claim 8, wherein the extracted metadata comprises a first portion that orders the plurality of frames of compressed image data, a second portion that indicates when image data of the plurality of frames compressed image data was generated, a third portion that indicates error states of the plurality of frames of compressed image frames, and a fourth portion indicating from which camera of the one or more cameras the image data of the plurality of frames of compressed image data was obtained.

10. The sensor unit of claim 8, wherein the processor is further configured to reformat the metadata extracted from each of the frames of uncompressed image data to generate reformatted metadata, and wherein reattaching the extracted metadata to corresponding frames of the plurality of frames of compressed image data comprises reattaching the reformatted metadata.

11. The sensor unit of claim 8, wherein each of the frames of the plurality of frames of uncompressed image data received from the cameras comprises one frame of raw image data, a header data and a footer data associated with the one frame of raw image data.

12. The sensor unit of claim 11, wherein the processor is further configured to replace or modify the footer data of one of the frames of the plurality of frames of uncompressed image data.

13. The sensor unit of claim 11, wherein the processor is further configured to extract the header data and the footer data from each of the frames of the plurality of frames of uncompressed image data to generate the plurality of frames of processed image data, and wherein compressing each of frames of the plurality of frames of processed image data comprises compressing each of the frames of raw image data.

14. The sensor unit of claim 8, wherein the processor is further configured to transmit the plurality of frames of compressed image frames to a perception and planning system via a host interface for operating the ADV.

15. An autonomous driving system, comprising:
a plurality of sensors to sense a driving environment surrounding an autonomous driving vehicle (ADV), including one or more cameras;
a perception and planning system to plan a path and control the ADV according to the path to navigate the driving environment; and
a sensor unit, wherein the sensor unit comprises:
a sensor interface configured to receive a plurality of frames of uncompressed image data from the one or more cameras,
a preprocessing module configured to append metadata to each of the frames of the plurality of frames of uncompressed image data to generate a plurality of metadata appended frames of uncompressed image data,
a processor configured to extract the metadata from each of the frames of the plurality of metadata appended frames of uncompressed image data to generate a plurality of frames of processed image data that do not comprise the extracted metadata, and
a video codec configured to compress each of the frames of the plurality of frames of processed image data to generate a plurality of frames of compressed image data,
wherein the processor is further configured to reattach the extracted metadata to corresponding frames of the plurality of frames of compressed image data to generate a plurality of compressed image frames, wherein the compressed image frames are utilized by the perception and planning system to perceive the driving environment surrounding the ADV.

16. The system of claim 15, wherein the extracted metadata comprises a first portion that orders the plurality of frames of compressed image data, a second portion that indicates when image data of the plurality of frames compressed image data was generated, a third portion that indicates error states of the plurality of frames of compressed image frames, and a fourth portion indicating from which camera of the one or more cameras the image data of the plurality of frames of compressed image data was obtained.

17. The system of claim 15, wherein the processor is further configured to reformat the metadata extracted from each of the frames of the plurality of frames of uncompressed image data to generate reformatted metadata, and wherein reattaching the extracted metadata to corresponding frames of the plurality of frames of compressed image data comprises reattaching the reformatted metadata.

18. The system of claim 15, wherein each of the frames of the plurality of frames of uncompressed image data received from the one or more cameras comprises one frame of raw image data, a header data and a footer data associated with the one frame of raw image data.

19. The system of claim 18, wherein the processor is further configured to replace or modify the footer data of one of the frames of the plurality of frames of uncompressed image data.

20. The system of claim 19, wherein the processor is further configured to extract the header data and the footer data from each of the frames of the plurality of frames of uncompressed image data to generate the plurality of frames of processed image data, and wherein compressing each of the frames of the plurality of frames of processed image data comprises compressing each of the frames of raw image data.

21. The system of claim 15, wherein the processor is further configured to transmit the plurality of frames of compressed image frames to a perception and planning system via a host interface for operating the ADV.

* * * * *